(12) United States Patent
Koide et al.

(10) Patent No.: US 10,279,395 B2
(45) Date of Patent: May 7, 2019

(54) CUTTING TOOL, SKIVING APPARATUS AND METHOD

(71) Applicant: AISIN KIKO CO., LTD., Nishio-shi, Aichi (JP)

(72) Inventors: Yoshiaki Koide, Nishio (JP); Masataka Kimura, Nishio (JP)

(73) Assignee: AISIN KIKO CO., LTD., Nishio-shi (JP)

( * ) Notice: Subject to any disclaimer, the term of this patent is extended or adjusted under 35 U.S.C. 154(b) by 0 days.

(21) Appl. No.: 15/558,887

(22) PCT Filed: Feb. 29, 2016

(86) PCT No.: PCT/JP2016/056107
§ 371 (c)(1),
(2) Date: Sep. 15, 2017

(87) PCT Pub. No.: WO2016/152396
PCT Pub. Date: Sep. 29, 2016

(65) Prior Publication Data
US 2018/0071827 A1    Mar. 15, 2018

(30) Foreign Application Priority Data
Mar. 25, 2015    (JP) .................. 2015-062926

(51) Int. Cl.
*B23B 5/00*    (2006.01)
*B23B 1/00*    (2006.01)
(Continued)

(52) U.S. Cl.
CPC .................. *B23B 1/00* (2013.01); *B23B 5/00* (2013.01); *B23B 27/00* (2013.01); *B23B 27/005* (2013.01);
(Continued)

(58) Field of Classification Search
CPC ..... B23B 1/00; B23B 2200/369; B23F 5/163; B23F 21/126; B23D 37/005
See application file for complete search history.

(56) References Cited

U.S. PATENT DOCUMENTS 2,553,966 A * 5/1951 Groene ..................... B23B 1/00
409/244
3,548,474 A * 12/1970 Meyer .................. B23D 37/005
407/17

(Continued)

FOREIGN PATENT DOCUMENTS

DE    102007033767 A1    1/2009
JP    S60-207701 A    10/1985
(Continued)

OTHER PUBLICATIONS

Mar. 22, 2016 Reply to the Opinion submitted to the IPEA in International Patent Application No. PCT/JP2016/056107.
(Continued)

*Primary Examiner* — Will Fridie, Jr.
(74) *Attorney, Agent, or Firm* — Oliff PLC

(57) ABSTRACT

A cutting tool 1 includes a cutting edge 2, a rake face 4 and a flank 5 and is used for cutting a surface of a cylindrical or columnar work W by a skiving process. The cutting tool 1 is configured to satisfy a relational expression:

$$\tan^{-1}(\cos\beta/\cos(\alpha-\beta)\times\tan^{-1}(\cos^{-1}(r'/r))<\varphi\leq 90°$$

where "$\varphi$" denotes a rake angle, "$\alpha$" denotes an inclination angle of the cutting edge 2 with respect to the rotation axis A, "$\beta$" denotes an angle between a feed direction of the cutting tool 1 and a direction orthogonal to a rotation axis A in a plane view of the cutting tool 1 and the work W, "r" denotes a radius of an outer circumferential surface of the (Continued)

work W before processing, and "r'" denotes the radius of the outer circumferential surface of the work W after processing.

13 Claims, 11 Drawing Sheets

(51) Int. Cl.
  *B23B 27/00* (2006.01)
  *B23B 27/14* (2006.01)
(52) U.S. Cl.
  CPC ........ *B23B 27/145* (2013.01); *B23B 2200/08* (2013.01); *B23B 2200/12* (2013.01); *B23B 2200/247* (2013.01); *B23B 2226/125* (2013.01); *B23B 2226/315* (2013.01)

(56) References Cited

U.S. PATENT DOCUMENTS

| | | | | |
|---|---|---|---|---|
| 5,218,893 | A * | 6/1993 | Shikata | B23B 1/00 82/1.11 |
| 5,752,402 | A * | 5/1998 | Barnes | B21D 19/005 409/138 |
| 5,778,745 | A * | 7/1998 | Furusawa | B23B 25/02 451/28 |
| 6,209,429 | B1 * | 4/2001 | Urso, III | B23B 1/00 82/1.11 |
| 6,394,718 | B1 * | 5/2002 | Doerfel | B23F 5/163 409/132 |
| 8,257,149 | B2 * | 9/2012 | Jaeger | B23B 1/00 451/49 |
| 10,016,815 | B2 * | 7/2018 | Ishihara | B23B 29/323 |
| 2003/0089204 | A1 | 5/2003 | Schreiber et al. | |
| 2005/0076754 | A1 | 4/2005 | Schreiber et al. | |
| 2016/0008900 | A1 * | 1/2016 | Sjoo | B23B 27/145 407/28 |
| 2016/0167145 | A1 * | 6/2016 | Vogel | B23F 5/163 409/36 |

FOREIGN PATENT DOCUMENTS

| | | |
|---|---|---|
| JP | H01-97501 A | 4/1989 |
| JP | 2002-263903 A | 9/2002 |
| JP | 2005-501749 A | 1/2005 |
| JP | 398-4052 B2 | 9/2007 |
| JP | 2010-221351 A | 10/2010 |
| JP | 5761374 B2 | 8/2015 |
| WO | 2013/088884 A1 | 6/2013 |

OTHER PUBLICATIONS

Apr. 17, 2017 International Preliminary Report on Patentability issued in International Patent Application No. PCT/JP2016/056107.
Mar. 9, 2016 Search Report issued in International Patent Application No. PCT/JP2016/056107.

* cited by examiner

CUTTING TOOL, SKIVING APPARATUS AND METHOD

This is a national phase application of PCT/JP2016/056107 filed 29 Feb. 2016, claiming priority to Japanese Patent Application No. JP2015-62926 filed 25 Mar. 2015, the contents of which are incorporated herein by reference.

TECHNICAL FIELD

The present disclosure relates to a cutting tool for a skiving process, a skiving apparatus and method.

BACKGROUND

A conventionally known skiving method for cutting a rotational symmetrical surface of a rotated work (processing object) inclines a cutting edge with respect to rotational axis of the work and introduces the cutting edge along the rotated work by a linear feed motion transversal to the rotational axis (as shown in, for example, Patent Literature 1). When the work is cut by the method, an inclination angle of the cutting edge with respect to the rotation axis is set to be more than 0° and less than 90°.

CITATION LIST

Patent Literature

PTL1: Japanese Patent No. 3984052

SUMMARY

The above skiving method increases processing speed and decreases surface roughness of the work after processing, compared with conventional cutting methods, so that mass productivity of cylindrical or columnar parts and the like may be improved. However, it is not easy to improve the surface roughness of the work after processing to a level in a mirror finish by polishing (so-called superfinishing, for example, Rz≤0.8z) using the conventional skiving method.

A subject matter of the disclosure is to decrease surface roughness of an outer circumferential surface of a work cut by a skiving process.

The disclosure is directed to a cutting tool. The cutting tool is configured to include a cutting edge, a rake face and a flank and used for cutting a surface of a cylindrical or columnar work by a skiving process that feeds the cutting edge to the rotated work so as to incline with respect to a rotation axis of the work. The cutting tool is configured to satisfy a following relational expression:

[Math. 1]

$$\tan^{-1}\left(\frac{\cos\beta}{\cos(\alpha-\beta)}\cdot\tan\left(\cos^{-1}\frac{r'}{r}\right)\right) < \varphi \leq 90° \quad (1)$$

where "φ" denotes a rake angle, "α" denotes an inclination angle of the cutting edge with respect to the rotation axis, "β" denotes an angle between a feed direction of the cutting tool and a direction orthogonal to the rotation axis in a plane view of the cutting tool and the work, "r" denotes a radius of an outer circumferential surface of the work before processing, and "r'" denotes the radius of the outer circumferential surface of the work after processing. The cutting tool enables surface roughness of the outer circumferential surface of the work cut by the skiving process to be satisfactorily decreased.

DESCRIPTION OF EMBODIMENTS

The following describes some embodiments of the disclosure with reference to drawings.

Figure 1:
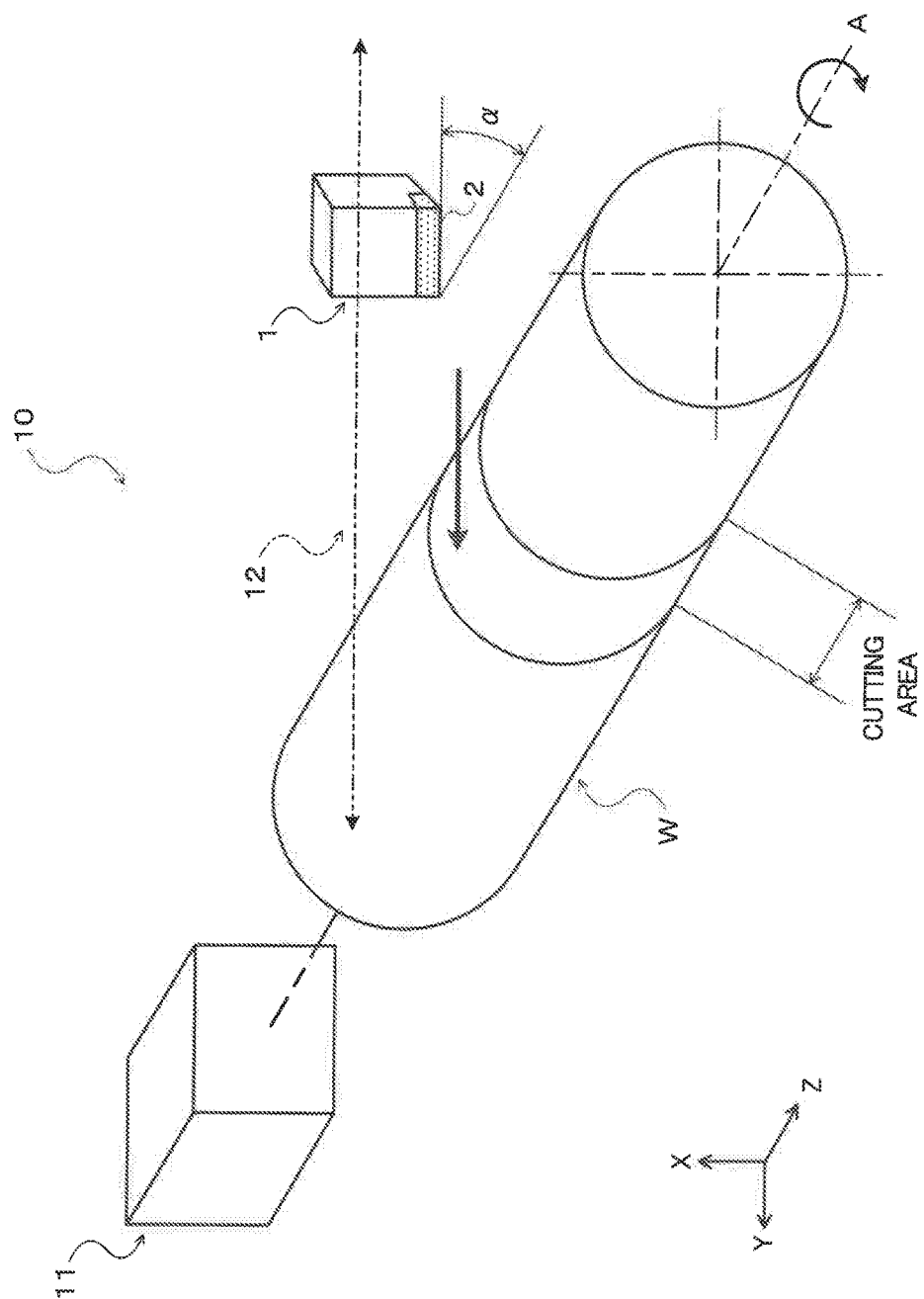
FIG. 1 is a schematic configuration diagram illustrating a skiving apparatus according to the disclosure.
Figure 2:
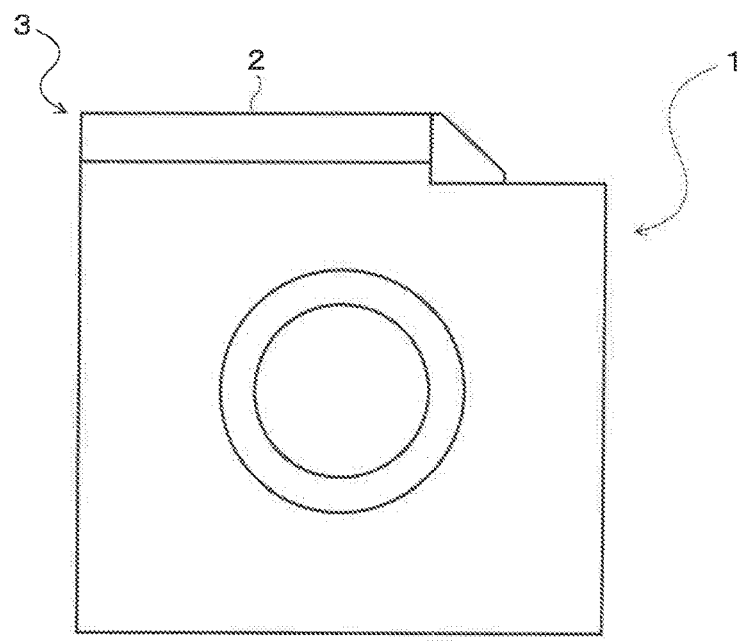
FIG. 2 is a plan view illustrating a cutting tool according to the disclosure.
Figure 3:
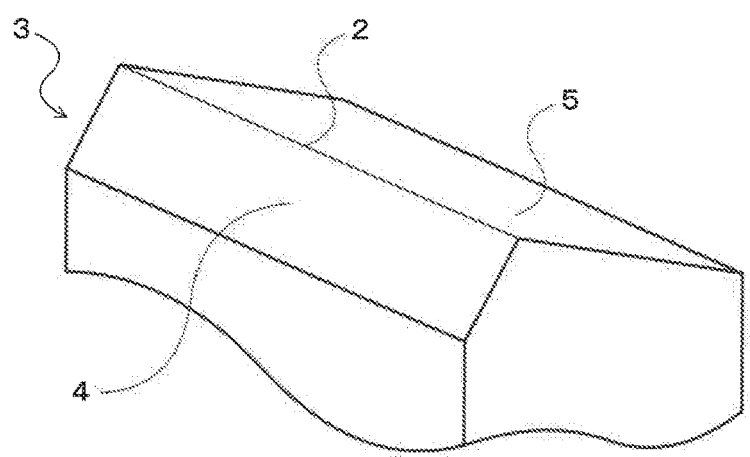
FIG. 3 is an enlarged perspective view illustrating the cutting tool according to the disclosure.

FIG. 1 is a schematic configuration diagram illustrating a skiving apparatus 10 according to the disclosure. The skiving apparatus 10 illustrated in the drawing cuts a cylindrical or columnar work W using a cutting tool 1 according to the disclosure by a skiving process to form an extremely smooth cylindrical surface on the work W. The skiving apparatus 10 is configured to include a rotation driving mechanism 11 that rotates the work W about a rotation axis A (Z-axis) and a feed mechanism 12 that moves the cutting tool 1 back and forth with respect to the work W. The cutting tool 1 is formed of cBN (Cubic Boron Nitride) or PCD (Poly Crystalline Diamond: sintered diamond) and configured to have a cutting edge portion 3 that included a linearly extending cutting edge 2. In addition to the cutting edge 2, the cutting edge portion 3 includes a rake face 4 continued to the cutting edge 2 and a flank 5 continued to the cutting edge 2 on an opposite side to the rake face 4.

Figure 4:
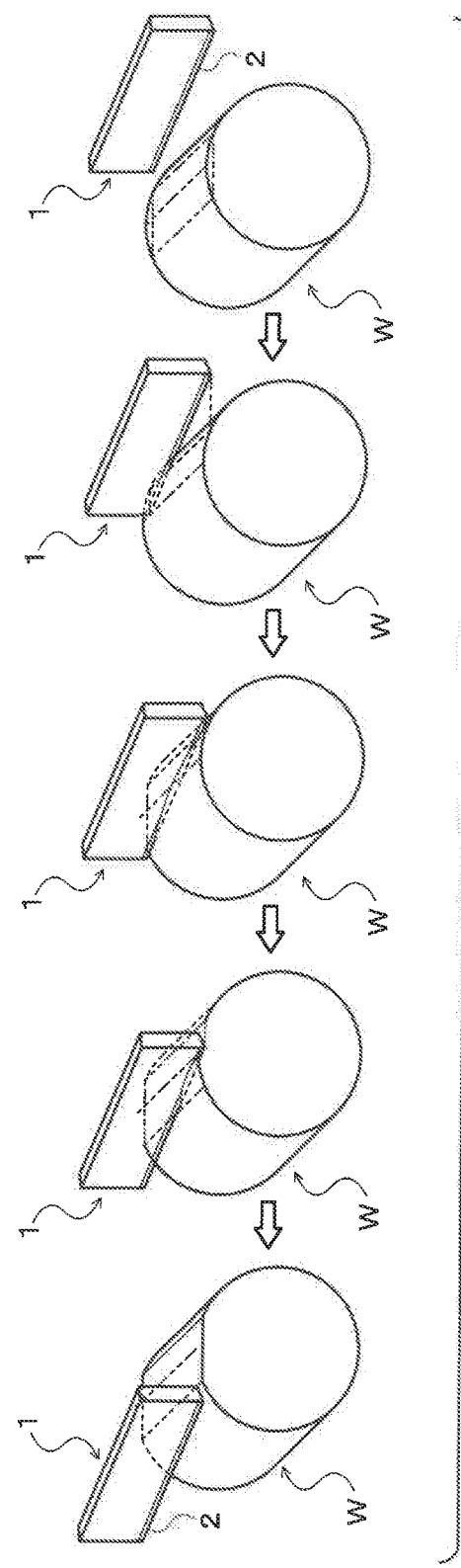
FIG. 4 is a schematic view illustrating a procedure of a skiving process.

When cutting an outer circumferential surface of the work W using the skiving apparatus 10 and the cutting tool 1, the cutting tool 1 is fed to the work W by the feed mechanism 12 in such a manner that the cutting edge 2 with respect to the rotation axis A (Z-axis) by an angle α (where 0°<α<90°) and with respect to a direction (Y-axis) orthogonal to the rotation axis A by an angle β (where −90°+α<β<90°, for example β=0° in FIG. 1) while rotating the work W about a rotation axis A in one direction by the rotation driving mechanism 11. As a result, as shown in FIG. 4, a surface layer of the work W is cut by the cutting edge 2 (tip of the cutting edge portion) of the cutting tool 1 tangentially fed to the outer circumferential surface of the work W. Such a skiving process increases processing speed and extremely decreases surface roughness of the work after processing, compared with conventional cutting processes.

Figure 5:
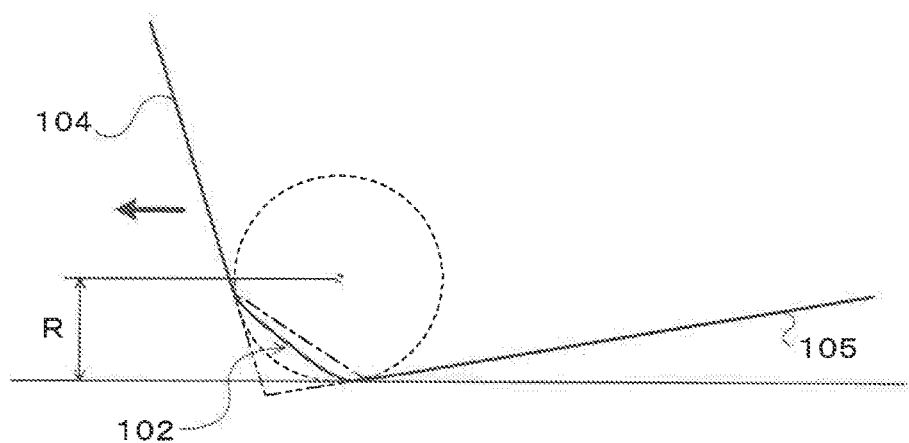
FIG. 5 is a schematic view illustrating a tip radius of a cutting edge of the cutting tool.
Figure 6:
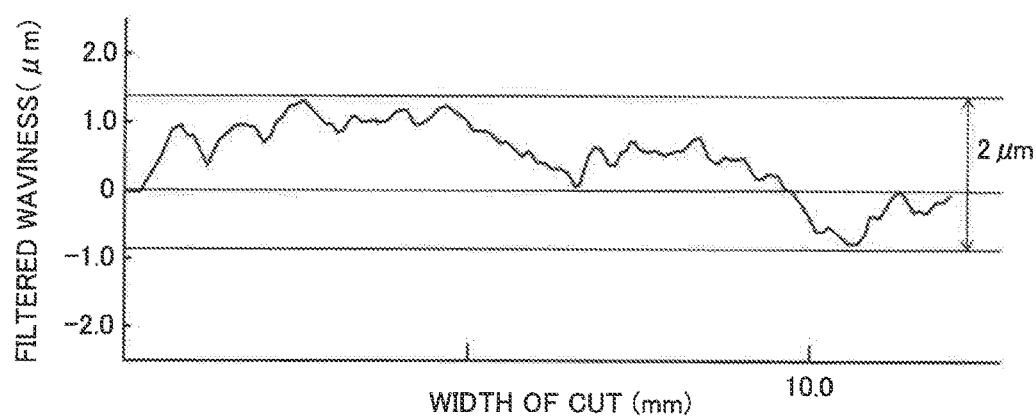
FIG. 6 is a diagram illustrating a straightness of a cutting edge of a conventional cutting tool.

The inventors have intensively studied to improve the surface roughness of the work after the skiving process to a level in a mirror finish by polishing (so-called superfinishing, for example, Rz≤0.8z). At first, the inventors have investigated a conventional cutting tool and measured a tip radius R of the cutting edge of the conventional cutting tool and a straightness (undulation) of the cutting edge (tip of the cutting edge portion). As shown in FIG. 5, the tip radius R is a radius of an inscribed circle (see a broken line in FIG. 5) that passes through both a flank-side end portion (boundary line between the rake face 104 and the cutting edge 102) of the rake face 104 and a rake face-side end portion (boundary line between the flank 105 and the cutting edge 102) of the flank 105 and is inscribed in both the rake face 104 and the flank 105. The tip radius R of the cutting edge of the conventional cutting tool has been measured as approximately 20 μm by the inventors. The straightness of the cutting edge has been represented by a filtered waviness curve obtained using surface roughness measuring instrument SURFCOM 1400D of TOKYO SEIMITSU Co., Ltd. FIG. 6 shows the filtered waviness curve that represents the straightness of the conventional cutting tool measured by the inventors. As shown in the figure, the straightness of the cutting edge of the conventional cutting tool, which is represented by the filtered waviness curve, has been approximately 2 μm. The cutting edge 102 is formed by any surface included in a region surrounded by a plane (see an one-dot chain line in FIG. 5) connecting a point of tangency between the rake face 104 and the above inscribed circle (the boundary line between the rake face 104 and the cutting edge 102) and a point of tangency between the flank 105 and the above inscribed circle (the boundary line between the flank 105 and the cutting edge 102) and two planes (see a two-dot chain line in FIG. 5) virtually extended from the rake face 104 or the flank 105.

Figure 7:
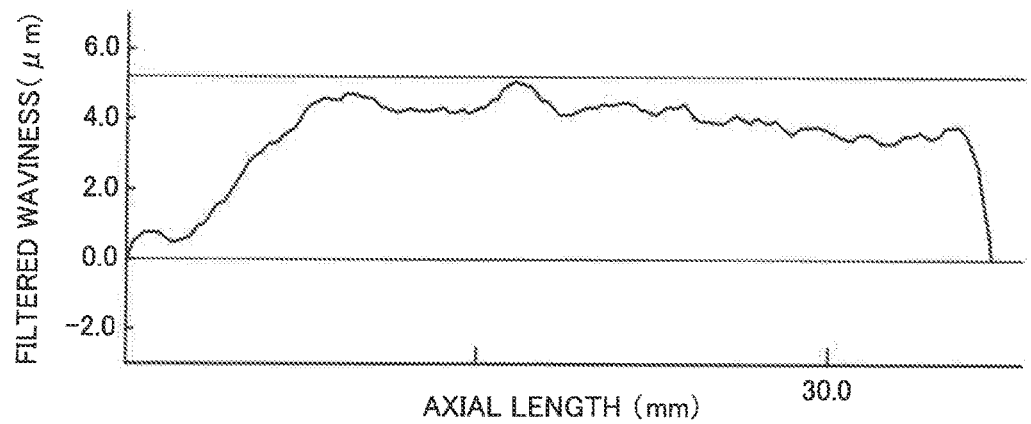
FIG. 7 is a diagram illustrating a straightness of an outer circumferential surface of a work after a skiving process using the conventional cutting tool.

Further, the inventors have measured the surface roughness of the outer circumferential surface and the straightness of the cylindrical work of which surface is cut by the skiving process using the conventional cutting tool with the above specifications. However, it has not been able to obtain the surface roughness of the level in the superfinishing by the skiving process using the conventional cutting tool. As shown in FIG. 7, the straightness of the outer circumferential surface of the work after processing has been approximately 5 μm, which is too large. Further, the conventional cutting tool has deteriorated dimensional accuracy in a start portion and a terminal portion of the process and irregular undulation has occurred in an intermediate portion in an axial direction. Furthermore, the conventional cutting tool has been quickly worn during the skiving process. Therefore, it is difficult to repeat the skiving process many times using the conventional cutting tool.

As described above, it is difficult to improve the surface roughness and the straightness of the outer circumferential surface of the work after the skiving process using the conventional cutting tool. That is, the above conventional cutting tool is basically same as a cutting tool used for a normal cutting process that plastically deforms the work by the rake face and strips off the surface layer of the work by the cutting edge. The conventional cutting tool has a relatively large tip radius of approximately 20 μm for example. Accordingly, it is necessary to design the cutting tool for the skiving process while considering a difference of characteristics between the normal cutting process and the skiving process that cuts the surface layer of the work by the cutting edge (tip of the cutting edge portion) of the cutting tool.

Figure 8:
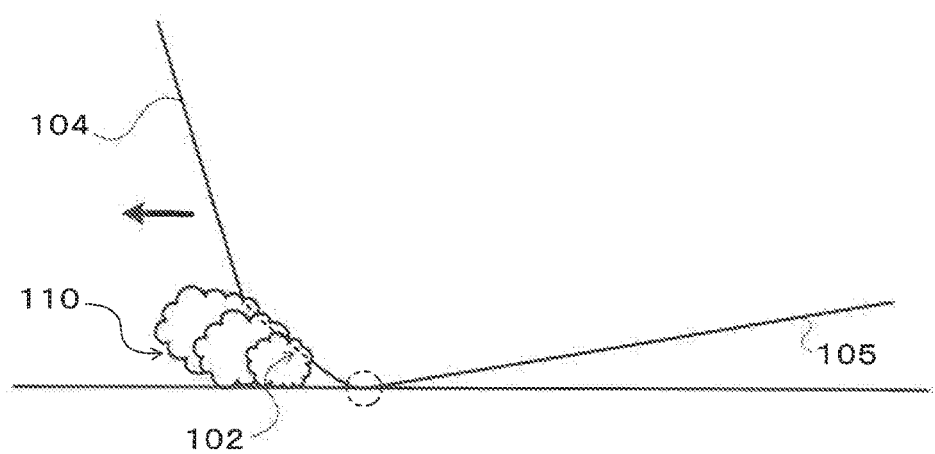
FIG. 8 is a schematic view illustrating a state during the skiving process using the conventional cutting tool.

From these viewpoints, the inventors have examined a state around the cutting edge of the conventional cutting tool during the skiving process in detail. As a result, the inventors have found it impossible to specify a portion actually used for cutting the work within the cutting edge (tip of the cutting edge portion) having a certain width (range) when using the conventional cutting tool with the relatively large tip radius of approximately 20 μm for example. Further, as shown in FIG. 8, the inventors have found that a rake face-side portion of the cutting edge 102 (honing, see in the vicinity of a dotted line portion in FIG. 8) works as a negative land (flank) when the portion of the cutting edge 102 near the flank 105 (the boundary between the flank 105 and the cutting edge 102, see a two dotted line circle in FIG. 8) cuts the work. In such a case, the cutting tool may be fed while chips 110 stay in the rake face-side portion of the cutting edge 102, so that the surface roughness of the work after processing may be deteriorated. Furthermore, many crater wears have been found in the portion of the rake face close to the cutting edge (position spaced from the tip of the cutting edge portion by approximately 0.03 mm) of the conventional cutting tool which has been used several times in the skiving process.

Based on these, the inventors minimize the tip radius R so as to sharpen the cutting edge 2 of the cutting tool 1 as much as possible. Further, a shape of the cutting edge (tip of the cutting edge portion) may be transferred to the outer circumferential surface of the work after the skiving process because the skiving process cuts the surface layer of the work by the cutting edge of the cutting tool. Therefore, the inventors minimize the straightness of the tip of the cutting edge portion of the cutting edge 2 in the cutting tool 1 as much as possible. In view of the above described characteristics of the skiving process, if the rake face 4 of the cutting tool 1 contacts with the surface of the work prior to a contact between the cutting edge 2 and the surface of the work, the cutting tool may be fed while chips stay in the portion of the rake face 4 close to the tip of the cutting edge portion (corresponding to the above portion working as the negative land (flank)), so that the surface roughness of the outer circumferential surface of the work to which the skiving process is applied may be deteriorated. Accordingly, the inventors have determined a rake angle φ of the rake face 4 of the cutting tool 1 as discussed below.

Figure 9:
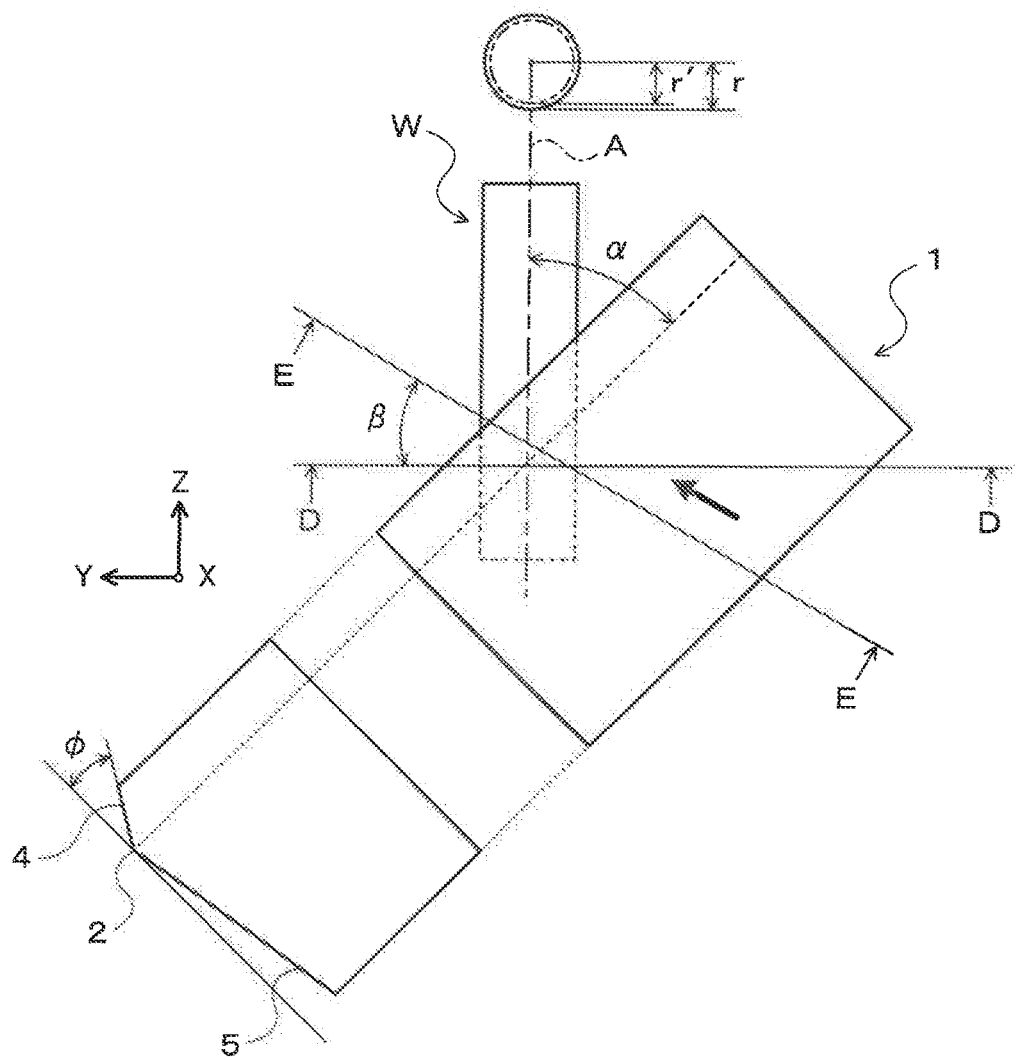
FIG. 9 is a schematic view illustrating a procedure for determining a proper range of a rake angle of the cutting tool for the skiving process.
Figure 10:
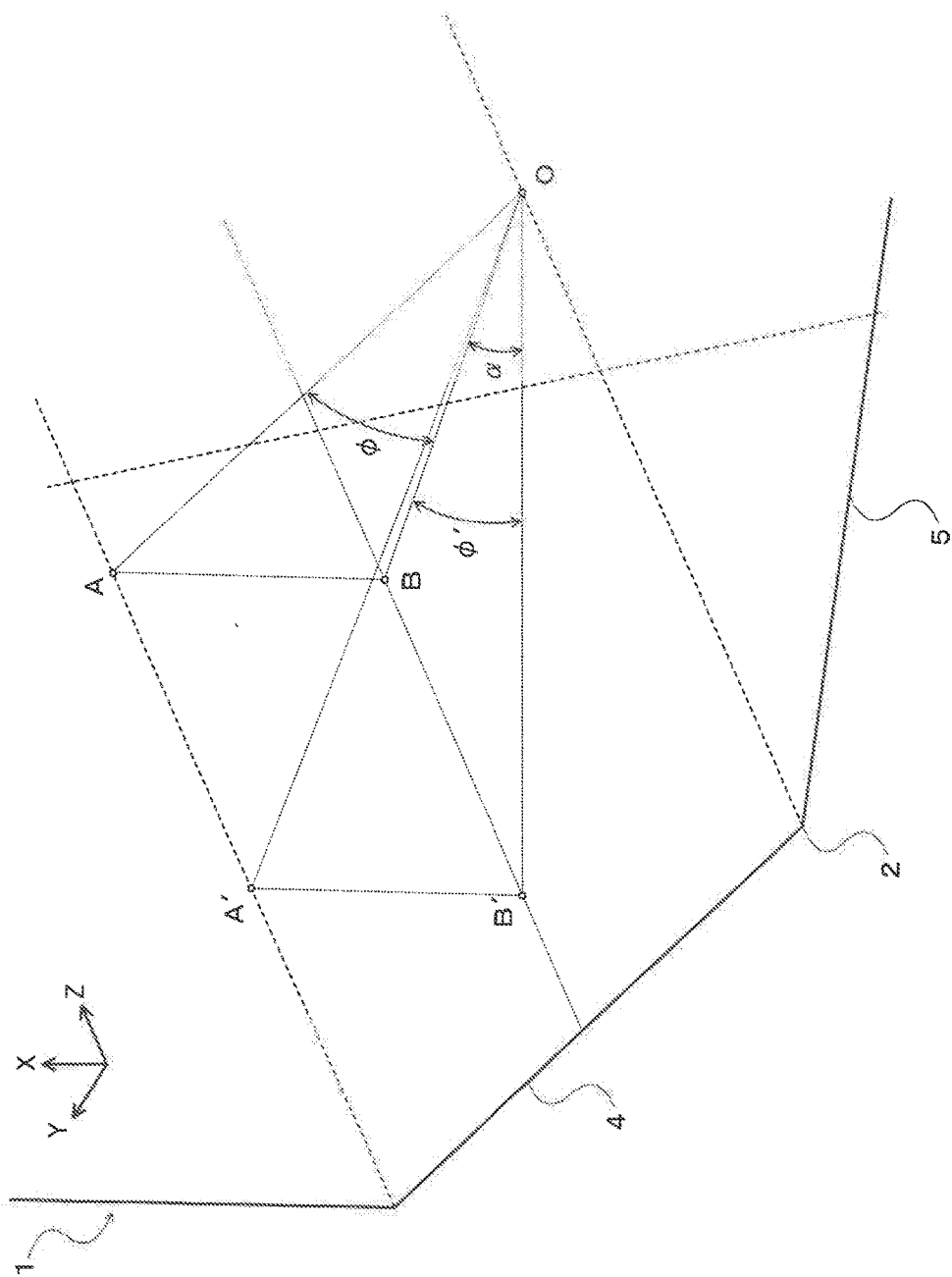
FIG. 10 is a schematic view illustrating the procedure for determining the proper range of the rake angle of the cutting tool for the skiving process.

As shown in FIG. 9, an extending direction of the rotation axis A of the work W is defined as a Z-axis direction. A direction orthogonal to the rotation axis A in a plane view of the cutting tool 1 and the work W is defined as a Y-axis direction. A direction orthogonal to both the Z-axis direction and the Y-axis direction is defined as an X-axis direction. As shown in FIGS. 9 and 10, when the cutting tool 1 is moved in the Y-axis direction (along a section D-D in FIG. 9, that is, β=0) while inclining the cutting tool 1 with respect to the Z-axis (rotation axis A) by the angle α (∠BOB'), a rake angel φ of the rake face 4 with respect to the work W is equal to ∠A'OB' in FIG. 10 and equations tan φ=AB/OB and tan φ'=A'B'/OB' are satisfied. The point "O" is any point on the cutting edge 2 (tip of the cutting edge portion).

Figure 11:
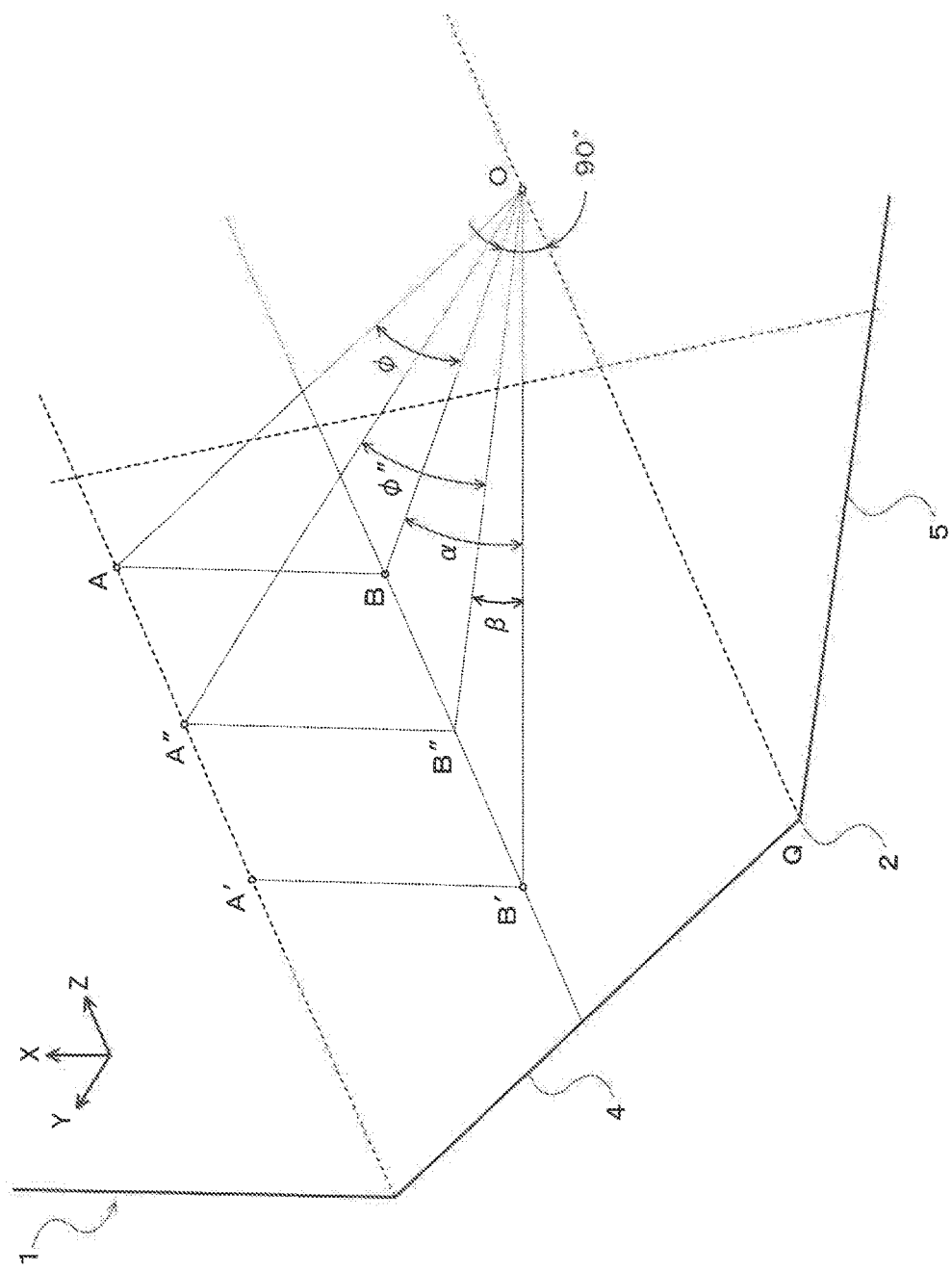
FIG. 11 is a schematic view illustrating the procedure for determining the proper range of the rake angle of the cutting tool for the skiving process.

As seen from FIG. 10, equations OB=OB'·cos α and AB=A'B' are satisfied. These equations derive an equation tan φ'=A'B'/OB'=AB/(OB/cos α)=cos α·tan φ, so that a following equation (2) is satisfied. Further, when the cutting tool 1 is moved along a section E-E in FIG. 9 while inclining the cutting edge 2 with respect to the Z-axis by the angle α and with respect to the Y-axis by the angle β, an equation ∠BOB"=α–β is satisfied as seen from FIG. 11. Therefore, the rake angel φ" (∠A"OB" in FIG. 11) is represented by a following equation (3) as with the equation (2).

$$\varphi' = \tan^{-1}(\cos\alpha \cdot \tan\varphi) \quad (2)$$

$$\varphi'' = \tan^{-1}(\cos(\alpha-\beta) \cdot \tan\varphi) \quad (3)$$

Now, the angle α (inclination angle) of the cutting tool 1 satisfies a relational expression 0°<α<90° in view of the characteristics of the skiving process. The angle β of the cutting tool 1 in a feeding direction of the cutting tool 1 may take a negative value when a clockwise direction in FIG. 9 is a positive direction. Further, the cutting tool 1 proceeds in parallel with an extending direction of the cutting edge 2 (tip of the cutting edge portion ridgeline OQ) when an equation β=∠B'OQ=–(90°–α) is satisfied. Accordingly, the angle β can take a value within a range of –90°+α<β<90°.

Figure 12:
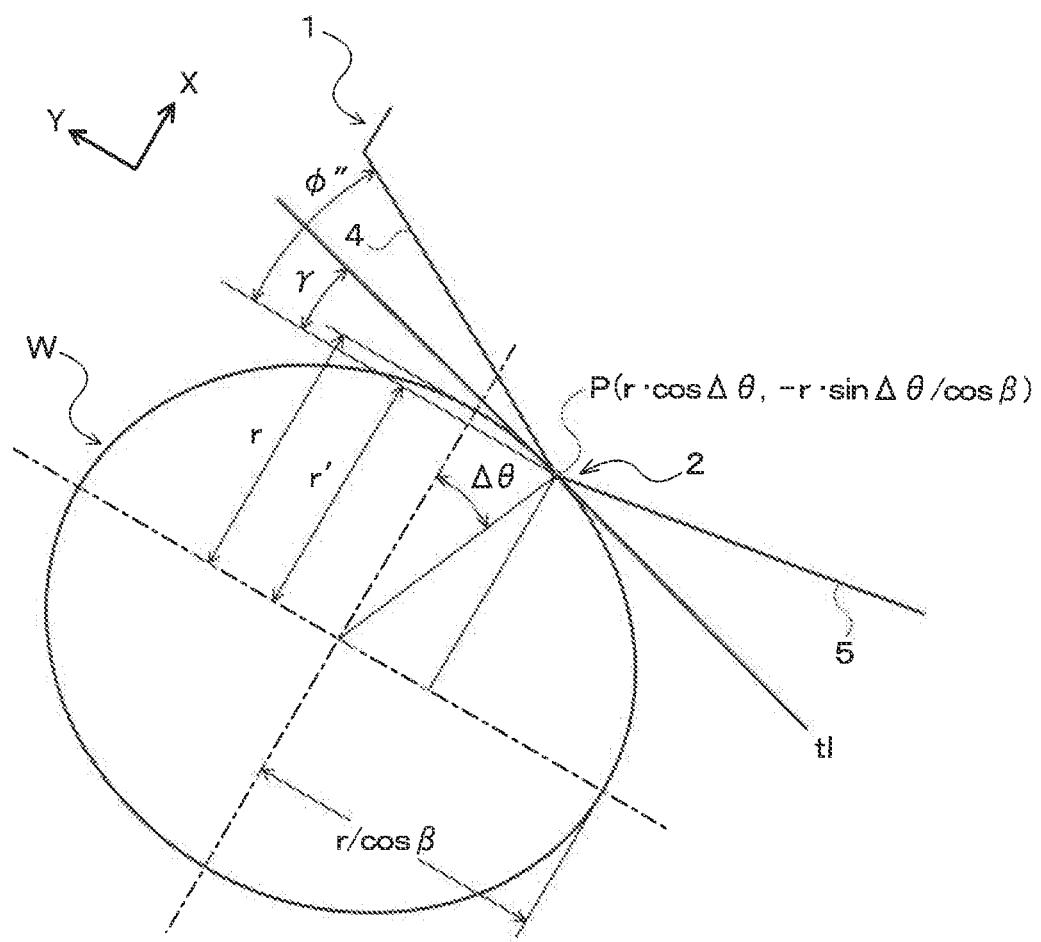
FIG. 12 is a schematic view illustrating the procedure for determining the proper range of the rake angle of the cutting tool for the skiving process.

FIG. 12 schematically shows the section E-E of the cutting tool 1 and the work W in FIG. 9. As shown in the drawing, a cross-section of the work W on the section E-E in FIG. 9 becomes an ellipse. A length of a minor axis of the ellipse along the X-axis in the figure is equal to a radius of the outer circumferential surface of the work W before the skiving process. A length of a major axis of the ellipse along the Y-axis in the figure is represented as r/cos β where "r" denotes a radius of the outer circumferential surface of the work W before the skiving process. The cross-section of the work W on the section E-E is represented as $x^2+y^2 \cdot \cos^2\beta = r^2$ from an elliptic equation.

A point (point of tangency) of the cutting edge 2 of the cutting tool 1 fed to the work W, which contacts with the work W, is represented as P of which coordinates are (r·cos Δθ, –r·sin Δθ/cos β) when the center of the work W (center of the ellipse) is defined as a coordinate origin, where "Δθ" denotes an angle between the X-axis and a line segment connecting a center of the work W (center of the ellipse in FIG. 12) and the point P. Further, following equations (4) and (5) are obtained by differentiating both sides of the elliptic equation $x^2+y^2 \cdot \cos^2\beta = r^2$ of the cross-section of the work W on the section E-E with respect to y. Furthermore, a following equation (6) is satisfied with respect to the point P, where "γ" denotes a gradient of a tangent tl to the ellipse at the point P.

[Math. 2]

$$2x \cdot \frac{dx}{dy} + 2y \cdot \cos^2\beta = 0 \quad (4)$$

$$\frac{dx}{dy} = -\frac{y \cdot \cos^2\beta}{x} \quad (5)$$

$$\tan\gamma = \frac{dx}{dy} = \quad (6)$$

$$-\frac{y \cdot \cos^2\beta}{x} = -\frac{1}{r \cdot \cos\Delta\theta} \cdot \cos^2\beta \cdot \left(-\frac{r}{\cos\beta} \cdot \sin\Delta\theta\right) = \cos\beta \cdot \tan\Delta\theta$$

A following equation (7) is satisfied from equations r'=r·cos Δθ, cos Δθ=r'/r, and Δθ=cos⁻¹(r'/r), where "r'" denotes the radius the work W after the skiving process. To bring the point P on the cutting edge 2 (tip of the cutting edge portion) in contact with the work W without bringing the rake face 4 in contact with the surface of the work W prior to the contact between the cutting edge 2 and the surface of the work W, it is necessary to satisfy φ">γ, that is, tan φ">tan γ. A following inequality (8) is obtained from the inequality tan φ">tan γ, equations (3) and (7). Further, a following relational expression (9) is obtained by rearranging the inequality (8). Accordingly, the cutting tool 1 is designed so as to satisfy a following relational expression (10), thereby preventing bringing the rake face 4 of the cutting tool 1 in contact with the surface of the work W prior to the contact between the cutting edge 2 and the surface of the work W upon the skiving process.

[Math. 3]

$$\tan\gamma = \cos\beta \cdot \tan\left(\cos^{-1}\frac{r'}{r}\right) \quad (7)$$

$$\cos(\alpha-\beta) \cdot \tan\varphi > \cos\beta \cdot \tan\left(\cos^{-1}\frac{r'}{r}\right) \quad (8)$$

$$\tan\varphi > \frac{\cos\beta}{\cos(\alpha-\beta)} \cdot \tan\left(\cos^{-1}\frac{r'}{r}\right) \quad (9)$$

$$\tan^{-1}\left(\frac{\cos\beta}{\cos(\alpha-\beta)} \cdot \tan\left(\cos^{-1}\frac{r'}{r}\right)\right) < \varphi \leq 90° \quad (10)$$

In order to satisfy the relational expression (10) and obtain the cutting tool 1 with the smaller tip radius R and the smaller straightness of the cutting edge 2, the inventors have adopted a Pulsed Laser Grinding (PLG) to form the cutting edge portion 3 of the cutting tool 1, that is, the cutting edge 2, the rake face 4 and the flank 5. The Pulsed Laser Grinding uses a condensing system with a relatively long focal length to form a substantially cylindrical processing range of laser extending along an optical axis direction and scans the processing range over a processing surface (machined surface) such that the processing surface becomes in parallel with the optical axis. The Pulsed Laser Grinding is a well-known processing technology that enables the surface roughness to be extremely small and the processing surface to be extremely smooth.

Figure 13:
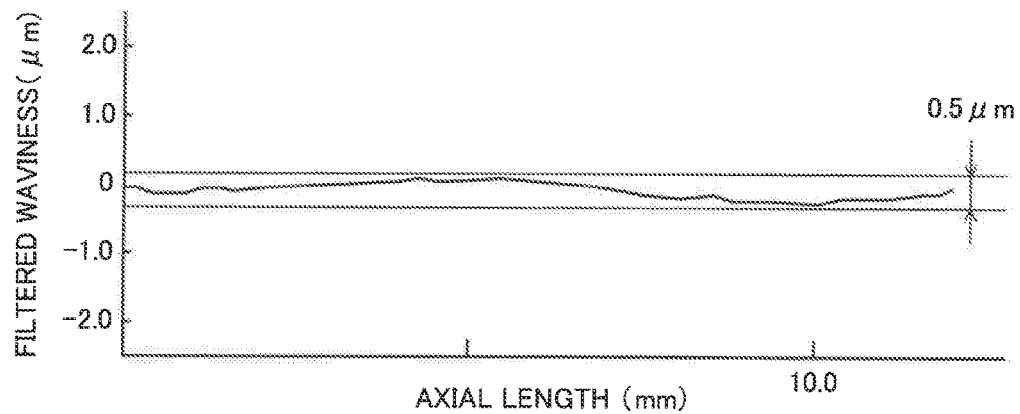
FIG. 13 is a diagram illustrating the straightness of the cutting edge of the cutting tool according to the disclosure.

The tip radius R of the cutting tool 1 produced by the Pulsed Laser Grinding has been larger than zero and equal to or less than 5 μm, specifically 3 μm. In the cutting tool 1, as shown in FIG. 13, the straightness of the cutting edge 2 represented by the filtered waviness curve (obtained using surface roughness measuring instrument SURFCOM 1400D) has been larger than zero and equal to or less than 0.5 μm. Further, the surface roughness of the outer circumferential surface of the work W after the skiving process using the cutting tool 1 has been satisfied 0<Rz≤0.8z and a diameter tolerance of the outer circumferential surface of the work W after the skiving process has been less than 10 μm.

Figure 14:
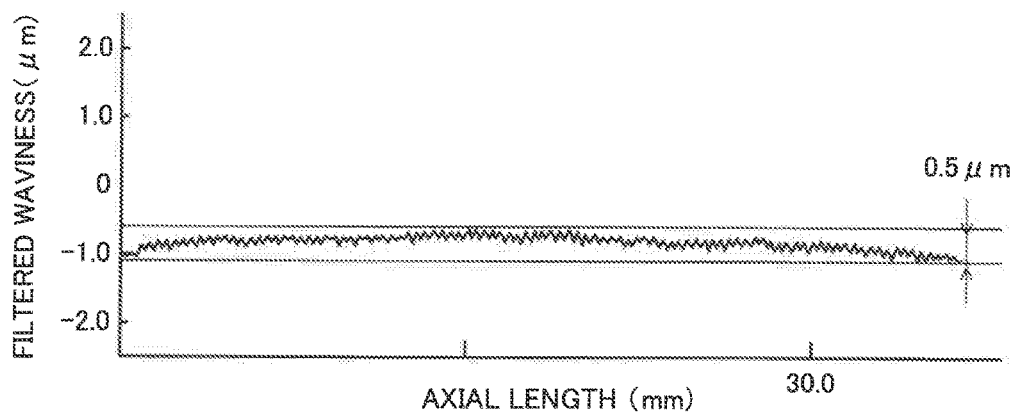
FIG. 14 is a diagram illustrating the straightness of the outer circumferential surface of the work after the skiving process using the cutting tool according to the disclosure.

As shown in FIG. 14, the straightness of the outer circumferential surface of the work W after the skiving process using the cutting tool 1 has been approximately 0.5 μm, which is larger than zero, but small enough. Further, the skiving process has been applied twice on a same processing object region, so that dimensional accuracy in the start portion and the terminal portion of the process of the work W has been satisfactorily improved as shown in FIG. 14.

From these results, it is understood that the cutting tool 1 produced to satisfy the relational expression (10) enables the surface roughness of the outer circumferential surface of the work W cut by the skiving process to be extremely decreased. Further, when the straightness of the cutting edge 2 represented by the filtered waviness curve is equal to or less than 0.5 μm, deterioration of the surface roughness is suppressed even if the shape of the cutting edge 2 is transferred to the outer circumferential surface of the work W after the skiving process, so that the surface roughness of the outer circumferential surface of the work W after processing becomes extremely small. In the cutting tool 1, the cutting edge 2 is formed by any surface included in the region surrounded by the plane connecting the point of tangency between the rake face 4 and the above inscribed circle and the point of tangency between the flank 5 and the inscribed circle and two planes virtually extended from the rake face 4 or the flank 5. Further, the tip radius R or the radius of the inscribed circle is equal to or less than 5 μm, specifically 3 μm. These enable the cutting edge 2 to smoothly cut the surface layer of the work W, so that the surface roughness of the outer circumferential surface of the work W after processing becomes extremely small.

Figure 15:
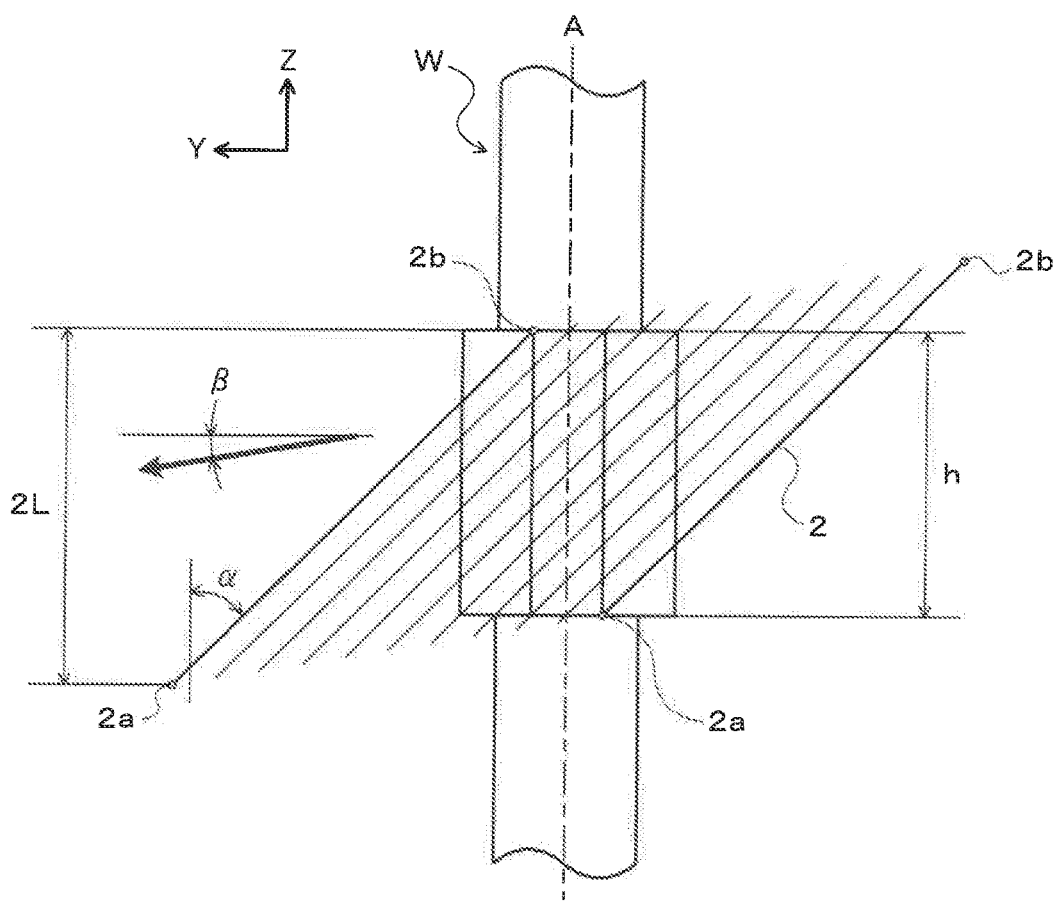
FIG. 15 a schematic view illustrating a procedure of the skiving process by a skiving apparatus according to the disclosure.

In the above skiving apparatus 10, the angle β in the feeding direction of the cutting tool 1 may take the negative value when the clockwise direction in FIG. 9 is the positive direction as described above. As shown in FIG. 15, the angle β between the Y-axis and the feeding direction (see a thick line in the figure) of the cutting tool 1 may be determined such that the cutting process of the work W is started when an one end 2a of the cutting edge 2 contacts with an one end (lower end in FIG. 15) of the work W in the extending direction of the rotation axis A and the cutting process (skiving process) of the work W is terminated when the other end 2b of the cutting edge 2 reaches the other end (upper end in FIG. 15) of the work W in the extending direction of the rotation axis A. This enables the work W to be cut by the whole cutting edge 2 even if a projected length 2L of the cutting edge 2 with respect to the rotation axis A is longer than a length h of the processing object region of the work W in the extending direction of the rotation axis A. As a result, uneven wear and the like of the cutting edge 2 is suppressed, thereby improving durability of the cutting tool 1.

As has been described above, a cutting tool according to the disclosure is configured to include a cutting edge, a rake face and a flank and used for cutting a surface of a cylindrical or columnar work by a skiving process that feeds the cutting edge to the rotated work so as to incline with respect to a rotation axis of the work. The cutting tool is configured to satisfy the above relational expression (10) where "φ" denotes a rake angle, "α" denotes an inclination angle of the cutting edge with respect to the rotation axis, "β" denotes an angle between a feed direction of the cutting tool and a direction orthogonal to the rotation axis in a plane view of the cutting tool and the work, "r" denotes a radius of an outer circumferential surface of the work before processing, and "r'" denotes the radius of the outer circumferential surface of the work after processing.

The skiving process cuts a surface layer of the work by the cutting edge (tip of the cutting edge portion) of the cutting tool. In this respect, the skiving process significantly differs from a normal cutting process that plastically deforms the work by the rake face and strips off the surface layer of the work by the cutting edge. If the rake face of the cutting tool contacts with the surface of the work prior to a contact between the cutting edge and the surface of the work upon the skiving process, surface roughness of the outer circumferential surface of the work after processing is deteriorated. Based on this, the cutting tool according to the disclosure is configured to satisfy the above relational expression (10). This prevents bringing the rake face of the cutting tool in contact with the surface of the work prior to the contact between the cutting edge and the surface of the work upon the skiving process. As a result, the cutting tool according to the disclosure enables the surface roughness of the outer circumferential surface of the work cut by the skiving process to be satisfactorily decreased.

A straightness of the cutting edge, which is represented by a filtered waviness curve, may be equal to or less than 0.5 μm. That is, a shape of the cutting edge (tip of the cutting edge portion) may be transferred to the outer circumferential surface of the work after the skiving process because the skiving process cuts the surface layer of the work by the cutting edge of the cutting tool. Accordingly, the straightness of the cutting edge represented by the filtered waviness curve is set to be equal to or less than 0.5 μm. This suppresses deterioration of the surface roughness even if the shape of the cutting edge is transferred to the outer circumferential surface of the work W after the skiving process, so that the surface roughness of the outer circumferential surface of the work after processing becomes extremely decreased.

A straightness of the outer circumferential surface of the work after processing, which is represented by a filtered waviness curve, may be equal to or less than 0.5 μm.

In the cutting tool, a radius of an inscribed circle that passes through both a flank-side end portion of the rake face and a rake face-side end portion of the flank and is inscribed in both the rake face and the flank may be equal to or less than 5 μm. When a radius of the inscribed circle is large, it is impossible to specify a portion actually used for cutting the work within the cutting edge (tip of the cutting edge portion) having a certain width (range). Further, a rake face-side portion of the cutting edge works as a negative land (flank) when the portion of the cutting edge near the flank (tip portion) cuts the work. This causes same problem as is the case when the rake face contacts with the surface of the work prior to the contact between the cutting edge and the surface of the work as described above. In contrast, when the radius of the above inscribed circle is equal to or less than 5 μm, the cutting edge smoothly cuts the surface layer of the work, so that the surface roughness of the outer circumferential surface of the work after processing becomes extremely decreased.

A skiving apparatus according to the disclosure is configured to cut a surface of a cylindrical or columnar work with a cutting tool that include a cutting edge, a rake face and a flank. The skiving apparatus is configured to include a rotation driving mechanism configured to rotate the work about a rotation axis and a feed mechanism configured to feed the cutting tool to the work while inclining the cutting edge with respect to the rotation axis by an angle α and with respect to a direction orthogonal to the rotation axis by an angle β. The cutting tool is configured to satisfy the above relational expression (10) where "φ" denotes a rake angle, "r" denotes a radius of an outer circumferential surface of the work before processing, and "r'" denotes the radius of the outer circumferential surface of the work after processing. The skiving apparatus enables the surface roughness of the outer circumferential surface of the work cut by the cutting tool to be satisfactorily decreased.

The angle β may be determined such that the cutting process of the work is started when an one end of the cutting edge contacts with an one end of the work in an extending direction of the rotation axis and the cutting process of the work is terminated when the other end of the cutting edge reaches the other end of the work in the extending direction of the rotation axis. This enables the work to be cut by the whole cutting edge even if a projected length of the cutting edge with respect to the rotation axis is longer than a length of the processing object region of the work in the extending direction of the rotation axis. As a result, uneven wear and the like of the cutting edge is suppressed, thereby improving durability of the cutting tool.

A skiving method according to the disclosure for cutting a surface of a cylindrical or columnar work uses a cutting tool that include a cutting edge, a rake face and a flank. The method feeds the cutting tool to the work that is rotated about a rotation axis while inclining the cutting edge with respect to the rotation axis by an angle α and with respect to a direction orthogonal to the rotation axis by an angle β. The angle β is determined such that a cutting process of the work is started when an one end of the cutting edge contacts with an one end of the work in an extending direction of the rotation axis and the cutting process of the work is terminated when the other end of the cutting edge reaches the other end of the work in the extending direction of the rotation axis. The cutting tool is configured to satisfy the above relational expression (10) where "φ" denotes a rake angle, "r" denotes a radius of an outer circumferential surface of the work before processing, and "r'" denotes the radius of the outer circumferential surface of the work after processing.

The method enables surface roughness of the outer circumferential surface of the work cut by the cutting tool to be satisfactorily decreased and the work to be cut by the whole cutting edge even if a projected length of the cutting edge with respect to the rotation axis is longer than a length of the processing object region of the work in the extending direction of the rotation axis.

A cutting tool according to another aspect of the disclosure is configured to include a cutting edge, a rake face and a flank and used for cutting a surface of a cylindrical or columnar work by a skiving process that feeds the cutting edge to the rotated work so as to incline with respect to a rotation axis of the work. A radius of an inscribed circle that passes through both a flank-side end portion of the rake face and a rake face-side end portion of the flank and is inscribed in both the rake face and the flank is equal to or less than 5 μm.

According to the cutting tool, the cutting edge smoothly cuts the surface layer of the work, so that the surface roughness of the outer circumferential surface of the work after processing becomes extremely decreased.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to the field of manufacture using the skiving process.

The invention claimed is:

1. A cutting tool configured to include a cutting edge, a rake face and a flank and used for cutting a surface of a cylindrical or columnar work by a skiving process that feeds the cutting edge to the rotated work so as to incline with respect to a rotation axis of the work,
   wherein the cutting tool is configured to satisfy a following relational expression:

[Math. 1]

$$\tan^{-1}\left(\frac{\cos\beta}{\cos(\alpha-\beta)}\cdot\tan\left(\cos^{-1}\frac{r'}{r}\right)\right) < \varphi \leq 90°$$

where "φ" denotes a rake angle, "α" denotes an inclination angle of the cutting edge with respect to the rotation axis, "β" denotes an angle between a feed direction of the cutting tool and a direction orthogonal to the rotation axis in a plane view of the cutting tool and the work, "r" denotes a radius of an outer circumferential surface of the work before processing, and "r'" denotes the radius of the outer circumferential surface of the work after processing, and
   wherein a radius of an inscribed circle that passes through both a flank-side end portion of the rake face and a rake face-side end portion of the flank and is inscribed in both the rake face and the flank is equal to or less than 5 μm.

2. The cutting tool according to claim 1,
   wherein a straightness of the cutting edge, which is represented by a filtered waviness curve, is equal to or less than 0.5 μm.

3. The cutting tool according to claim 2,
   wherein a straightness of the outer circumferential surface of the work after processing, which is represented by the filtered waviness curve, is equal to or less than 0.5 μm.

4. A skiving apparatus configured to cut a surface of a cylindrical or columnar work with a cutting tool that include a cutting edge, a rake face and a flank, the skiving apparatus comprising:
   a rotation driving mechanism configured to rotate the work about a rotation axis;
   a feed mechanism configured to feed the cutting tool to the work while inclining the cutting edge with respect to the rotation axis by an angle α and with respect to a direction orthogonal to the rotation axis by an angle β,
   wherein the cutting tool is configured to satisfy a following relational expression:

[Math. 2]

$$\tan^{-1}\left(\frac{\cos\beta}{\cos(\alpha-\beta)}\cdot\tan\left(\cos^{-1}\frac{r'}{r}\right)\right) < \varphi \leq 90°$$

where "φ" denotes a rake angle, "r" denotes a radius of an outer circumferential surface of the work before processing, and "r'" denotes the radius of the outer circumferential surface of the work after processing, and wherein a radius of an inscribed circle that passes through both a flank-side end portion of the rake face and a rake face-side end portion of the flank and is inscribed in both the rake face and the flank is equal to or less than 5 μm.

5. The skiving apparatus according to claim 4, wherein a straightness of the cutting edge, which is represented by a filtered waviness curve, is equal to or less than 0.5 μm.

6. The skiving apparatus according to claim 4, wherein the angle β is determined such that a cutting process of the work is started when an one end of the cutting edge contacts with an one end of the work in an extending direction of the rotation axis and the cutting process of the work is terminated when the other end of the cutting edge reaches the other end of the work in the extending direction of the rotation axis.

7. A skiving method for cutting a surface of a cylindrical or columnar work with a cutting tool that include a cutting edge, a rake face and a flank, the method comprising:

feeding the cutting tool to the work that is rotated about a rotation axis while inclining the cutting edge with respect to the rotation axis by an angle α and with respect to a direction orthogonal to the rotation axis by an angle β, wherein the angle β is determined such that a cutting process of the work is started when an one end of the cutting edge contacts with an one end of the work in an extending direction of the rotation axis and the cutting process of the work is terminated when the other end of the cutting edge reaches the other end of the work in the extending direction of the rotation axis, wherein the cutting tool is configured to satisfy a following relational expression:

[Math. 3]

$$\tan^{-1}\left(\frac{\cos\beta}{\cos(\alpha-\beta)}\cdot\tan\left(\cos^{-1}\frac{r'}{r}\right)\right) < \varphi \leq 90°$$

where "φ" denotes a rake angle, "r" denotes a radius of an outer circumferential surface of the work before processing, and "r'" denotes the radius of the outer circumferential surface of the work after processing, and wherein a radius of an inscribed circle that passes through both a flank-side end portion of the rake face and a rake face-side end portion of the flank and is inscribed in both the rake face and the flank is equal to or less than 5 μm.

8. The skiving method according to claim 7, wherein a straightness of the cutting edge, which is represented by a filtered waviness curve, is equal to or less than 0.5 μm.

9. A cutting tool configured to include a cutting edge, a rake face and a flank and used for cutting a surface of a cylindrical or columnar work by a skiving process that feeds the cutting edge to the rotated work so as to incline with respect to a rotation axis of the work, wherein the cutting tool is configured to bring the cutting edge in contact with the surface of the work prior to a contact between the rake face and the surface of the work when the cutting tool is fed to the work, wherein a radius of an inscribed circle that passes through both a flank-side end portion of the rake face and a rake face-side end portion of the flank and is inscribed in both the rake face and the flank is equal to or less than 5 μm, and wherein a straightness of the cutting edge, which is represented by a filtered waviness curve, is equal to or less than 0.5 μm.

10. The cutting tool according to claim 9, wherein a straightness of the outer circumferential surface of the work after processing, which is represented by the filtered waviness curve, is equal to or less than 0.5 μm.

11. A skiving apparatus configured to cut a surface of a cylindrical or columnar work with a cutting tool that include a cutting edge, a rake face and a flank, the skiving apparatus comprising:

a rotation driving mechanism configured to rotate the work about a rotation axis;

a feed mechanism configured to feed the cutting tool to the work while inclining the cutting edge with respect to the rotation axis by an angle α and with respect to a direction orthogonal to the rotation axis by an angle β, wherein the cutting tool is configured to bring the cutting edge in contact with the surface of the work prior to a contact between the rake face and the surface of the work when the cutting tool is fed to the work by the feed mechanism, wherein a radius of an inscribed circle that passes through both a flank-side end portion of the rake face and a rake face-side end portion of the flank and is inscribed in both the rake face and the flank is equal to or less than 5 μm, and wherein a straightness of the cutting edge, which is represented by a filtered waviness curve, is equal to or less than 0.5 μm.

12. The skiving apparatus according to claim 11, wherein the angle β is determined such that a cutting process of the work is started when an one end of the cutting edge contacts with an one end of the work in an extending direction of the rotation axis and the cutting process of the work is terminated when the other end of the cutting edge reaches the other end of the work in the extending direction of the rotation axis.

13. A skiving method for cutting a surface of a cylindrical or columnar work with a cutting tool that include a cutting edge, a rake face and a flank, the method comprising:

feeding the cutting tool to the work that is rotated about a rotation axis while inclining the cutting edge with respect to the rotation axis by an angle α and with respect to a direction orthogonal to the rotation axis by an angle β, wherein the angle β is determined such that a cutting process of the work is started when an one end of the cutting edge contacts with an one end of the work in an extending direction of the rotation axis and the cutting process of the work is terminated when the other end of the cutting edge reaches the other end of the work in the extending direction of the rotation axis, wherein the cutting tool is configured to bring the cutting edge in contact with the surface of the work prior to a contact between the rake face and the surface of the work when the cutting tool is fed to the work, wherein a radius of an inscribed circle that passes through both a flank-side end portion of the rake face and a rake face-side end portion of the flank and is inscribed in both the rake face and the flank is equal to or less than 5 μm, and wherein a straightness of the cutting edge, which is represented by a filtered waviness curve, is equal to or less than 0.5 μm.

* * * * *